United States Patent
Benson

(10) Patent No.: US 7,155,210 B2
(45) Date of Patent: Dec. 26, 2006

(54) SYSTEM AND METHOD FOR SHORT-RANGE WIRELESS RETAIL ADVERTISING AIMED AT SHORT-RANGE WIRELESS PROTOCOL-ENABLED PERSONAL DEVICES

(75) Inventor: Christopher M. Benson, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 491 days.

(21) Appl. No.: 10/015,431

(22) Filed: Dec. 13, 2001

(65) Prior Publication Data
US 2003/0114146 A1 Jun. 19, 2003

(51) Int. Cl.
*H04Q 3/42* (2006.01)
(52) U.S. Cl. ............... 455/414.2; 455/414.1; 455/414.3; 705/26; 705/27
(58) Field of Classification Search ............ 455/414.1, 455/414.3, 456.6, 432.1, 426.1, 414.2; 705/14, 705/26, 27, 15; 340/5.91
See application file for complete search history.

(56) References Cited

U.S. PATENT DOCUMENTS

| | | | | |
|---|---|---|---|---|
| 5,150,127 | A * | 9/1992 | Aw ............................ | 342/169 |
| 5,227,230 | A * | 7/1993 | McGlade .................. | 428/319.1 |
| 5,979,757 | A | 11/1999 | Tracy et al. | |
| 6,545,596 | B1 * | 4/2003 | Moon ....................... | 340/425.5 |
| 6,587,835 | B1 * | 7/2003 | Treyz et al. ................... | 705/14 |
| 6,754,484 | B1 * | 6/2004 | Hiltunen et al. ......... | 455/412.1 |
| 2001/0005845 | A1 * | 6/2001 | Azuma ......................... | 707/1 |
| 2001/0014870 | A1 * | 8/2001 | Saito et al. ................... | 705/14 |
| 2001/0047294 | A1 | 11/2001 | Rothschild | |
| 2002/0008626 | A1 * | 1/2002 | Waters et al. ............ | 340/573.1 |
| 2002/0042774 | A1 * | 4/2002 | Ortiz et al. ................... | 705/39 |
| 2002/0046107 | A1 * | 4/2002 | Marshall et al. .............. | 705/14 |
| 2002/0049535 | A1 * | 4/2002 | Rigo et al. ................... | 701/211 |
| 2002/0077910 | A1 * | 6/2002 | Shioda et al. ................. | 705/14 |
| 2002/0138345 | A1 * | 9/2002 | Dickson et al. ............... | 705/14 |

(Continued)

FOREIGN PATENT DOCUMENTS

WO WO 01/33437 5/2001

(Continued)

OTHER PUBLICATIONS

IEEE, XP-000970589, "BLUETOOTH (TM) : A New Radio Interface Providing Obiquitous Connectivity", Haartsen, vol. 1, conf. 51, May 15, 2000, pp. 107-111.

*Primary Examiner*—Danh Cong Le
(74) *Attorney, Agent, or Firm*—Maginot, Moore & Beck LLP; Harden E. Stevens, III

(57) ABSTRACT

A system, method and apparatus is presented that provides advertising transmitted from a business to prospective customers that are proximate the business premises via a short-range wireless transmission protocol receivable by personal devices enabled with the short-range wireless transmission protocol. Preferably, the personal devices are already enabled with the short-range wireless transmission protocol. As well, the short-range wireless transmission protocol is preferably Bluetooth™. The advertising may be either only one-way from the business or may be interactive (two-way) between the business and a prospective customer. In the one-way transmission mode, the personal device only receives the advertisement. The advertisement is preferably automatically received and played on the personal device. In the interactive or two-way mode, the personal device not only receives the advertisement, the personal device is able to interact with or respond to the advertisement. In the interactive mode the personal device is thus operative to send information back to the business.

18 Claims, 4 Drawing Sheets

U.S. PATENT DOCUMENTS

| | | |
|---|---|---|
| 2002/0138433 A1 * | 9/2002 | Black et al. .................. 705/43 |
| 2002/0161637 A1 | 10/2002 | Sugaya |
| 2002/0184089 A1 * | 12/2002 | Tsou et al. .................... 705/14 |
| 2003/0034954 A1 * | 2/2003 | Sakamaki et al. .......... 345/156 |

FOREIGN PATENT DOCUMENTS

| | | |
|---|---|---|
| WO | WO 01/54104 | 7/2001 |
| WO | WO 01/63430 | 8/2001 |
| WO | WO 01/71591 | 9/2001 |
| WO | WO 01/76709 | 10/2001 |
| WO | WO 01/80122 | 10/2001 |

* cited by examiner

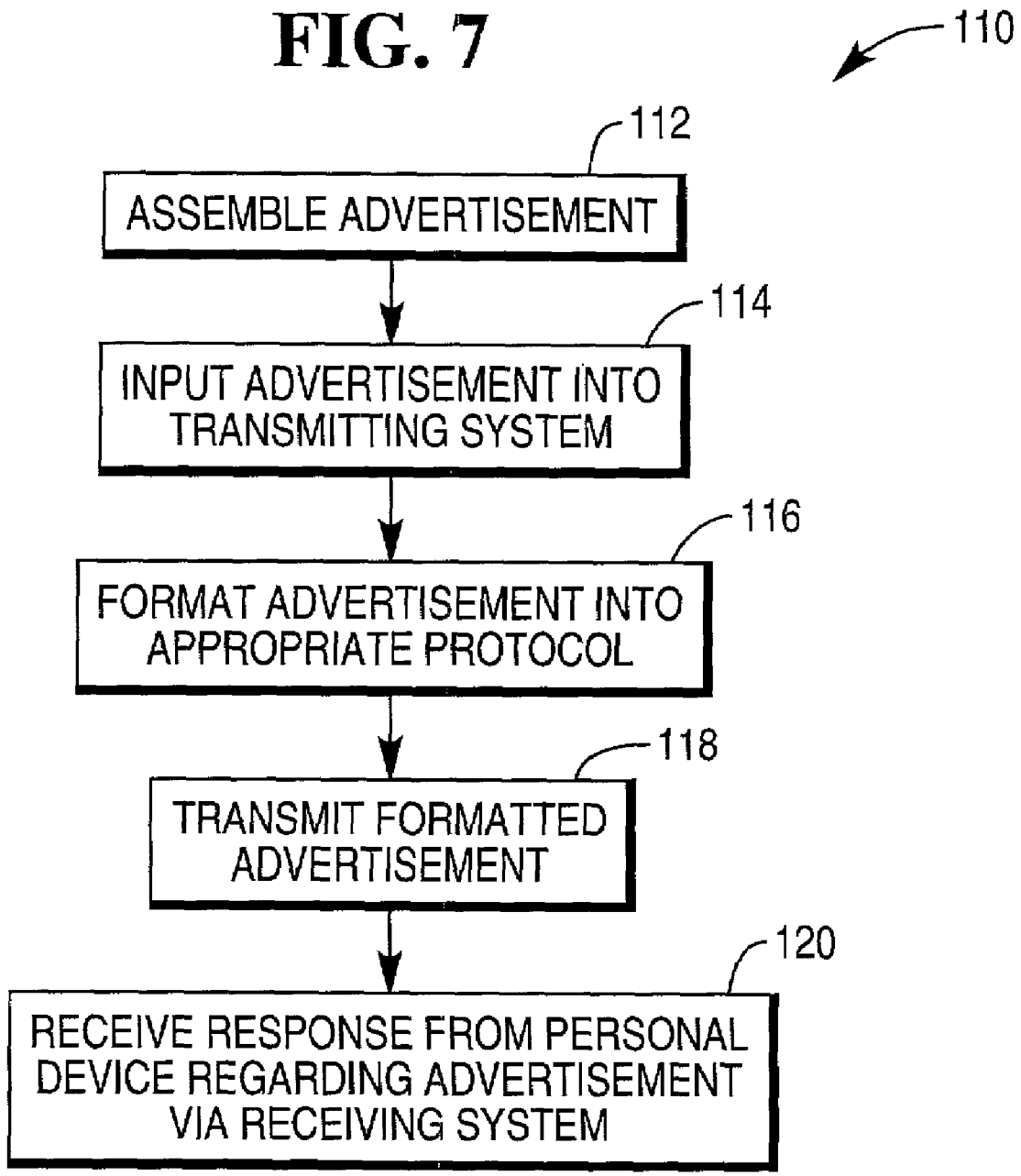

SYSTEM AND METHOD FOR SHORT-RANGE WIRELESS RETAIL ADVERTISING AIMED AT SHORT-RANGE WIRELESS PROTOCOL-ENABLED PERSONAL DEVICES

BACKGROUND

1. Field of the Invention

The present invention relates generally to short-range wireless communications and, more particularly, to short-range wireless communications pertaining to advertising.

2. Background Information

Advertising is one way that a business accomplishes many functions with respect to potential customers. In one respect, advertising enables a potential customer to know what products and/or services are offered by the business. In another respect, advertising enables a potential customer to know prices for many of the products and/or services offered by the business. In still another respect, advertising provides a way for the business to entice prospective customers to enter the business with the potential to purchase the goods and/or services offered by the business.

Advertising can be accomplished utilizing various media such as print and electronic. Print media includes newspapers, magazines, flyers, brochures, billboards, signs, and the like. One problem with print media for advertising is its static nature, i.e. it is not easily changeable. Additionally, with the exception of some signs and/or billboards, potential customers may not read print media because of not receiving the print media.

Electronic media includes television and radio. One problem with television advertising is its high cost both for fees paid to play the advertisement on the television and of production of the advertisement. Television is also remote from the business and requires that a potential customer watch the particular television channel at the particular time that the advertisement or commercial is being run. Radio advertising has the same problems as television advertising.

When a potential customer is proximate or exterior to the business, all forms of advertising other than signs on or adjacent to the business or audio broadcasting from the business are ineffective to immediately reach the potential customer (with the exception of happenstance listening/viewing of a radio/television advertisement on a portable radio/television). It is therefore a quandary on how to entice a prospective customer that is proximate a business to enter the business. It is also a problem on how to inform a prospective customer of current specials or sales other than signs. As an example, a restaurant typically can only provide information regarding a "today's special" via a sign. The potential customer must then focus on the restaurant.

It would thus be advantageous to have a manner of advertising that alleviates the above-noted shortcomings and/or problems. It would thus be further advantageous to have a manner of advertising that targets prospective customers that are proximate a business other than via print.

What is therefore needed is a manner of advertising to prospective customers that are proximate a business that overcomes one or more of the above-mentioned drawbacks. What is particularly needed is a manner of advertising to prospective customers that are proximate a business in a more effective manner than the prior art.

SUMMARY

The subject invention is a system, apparatus and method that provides advertising from a business to prospective customers that are proximate the business.

Particularly, the subject invention is a system, apparatus and method that provides advertising transmitted from a business to prospective customers that are proximate the business premises via a short-range wireless transmission protocol receivable by personal devices enabled with the short-range wireless transmission protocol. Preferably, the personal devices are already enabled with the short-range wireless transmission protocol. As well, the short-range wireless transmission protocol is preferably Bluetooth™.

Such advertising may be either only one-way from the business or may be interactive (two-way) between the business and a prospective customer. In the one-way transmission mode, the personal device only receives the advertisement. The advertisement is preferably automatically received and played on the personal device. In the interactive or two-way mode, the personal device not only receives the advertisement, the personal device is able to interact with or respond to the advertisement. In the interactive mode the personal device is thus operative to send information back to the business.

In accordance with an aspect of the subject invention, there is provided a method of providing an advertisement for a store to a prospective customer. The method includes the steps of: (a) compiling an advertisement; (b) formatting the advertisement into a radio signal having a radio transmission protocol that is receivable by a personal device of a prospective customer, the personal device having a radio receiver enabled to receive the transmission protocol signal; and (c) transmitting the radio signal from the store.

In accordance with another aspect of the subject invention, there is provided an apparatus for providing an advertisement to a prospective customer. The apparatus includes a storage device, a transmitter in communication with the storage device, and an antenna in communication with the transmitter. The storage device is operative to store an advertisement. The transmitter is operative to receive the advertisement from the storage device and format the advertisement into a radio signal having a radio transmission protocol that is receivable by a personal device of a prospective customer having a radio receiver enabled to receive the transmission protocol signal. The antenna is operative to transmit the radio signal from the store.

In accordance with yet another aspect of the subject invention, there is provided a system for store advertising. The system includes a storage device, a transmitter in communication with the storage device, a receiver, and an antenna in communication with the transmitter and the receiver, all of which are located at the store. The storage device is operative to store a store advertisement. The transmitter is operative to receive the advertisement from the storage device and to format the advertisement into a radio signal having a radio transmission protocol that is receivable by a personal device of a prospective customer having a radio receiver enabled to receive the transmission protocol signal. The receiver is operative to receive an incoming radio signal of the radio transmission protocol from the personal device of the prospective customer. The antenna is operative to transmit the radio signal from the store and receive the incoming radio signal from the personal device.

BRIEF DESCRIPTION OF THE DRAWINGS

FIG. 7 is a flowchart of an exemplary manner of operation of the subject invention.

Corresponding reference characters indicate corresponding parts throughout the several views.

DETAILED DESCRIPTION OF THE INVENTION

Figure 1:
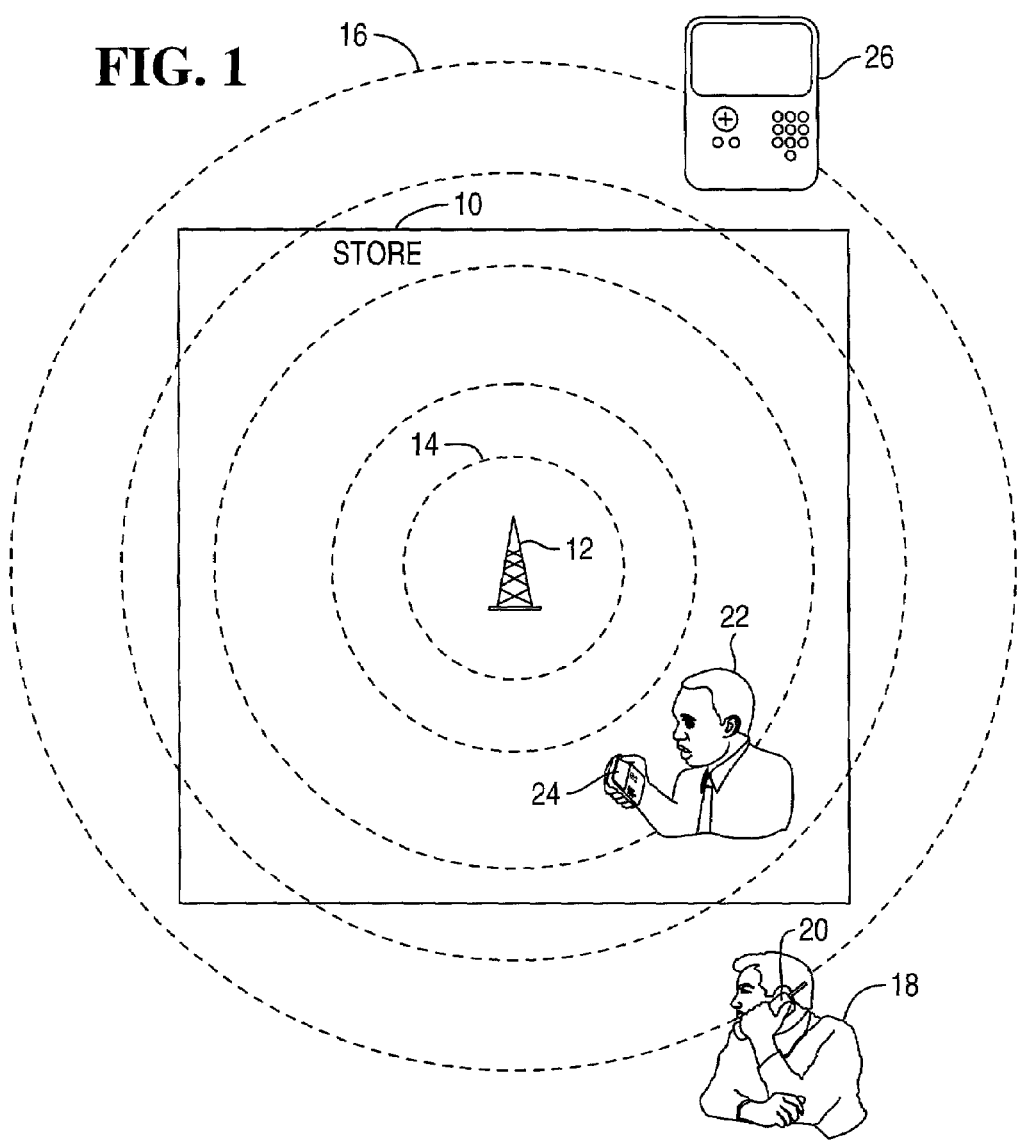
FIG. 1 is a representative diagram of a store having an exemplary wireless broadcasting system in accordance with the principles of the subject invention.

Referring to FIG. 1, there is depicted a representation of a store, generally designated 10, that utilizes the subject invention. The store 10 is representative of any type of store, restaurant, or the like (collectively, "store"). The store 10 is shown having an embodiment of the subject invention. In particular, the store 10 has a broadcasting or transmission system generally designated 12. The broadcasting system 12 is operative to generate and transmit/broadcast a signal 14 represented by the substantially concentric dashed circles. The signal 14 has a signal strength that defines a perimeter 16 at which the signal falls off to essentially zero signal strength or is too weak to be received. In accordance with an aspect of the subject invention, the signal strength of the signal 14 is such that the perimeter 16 is only a short distance from the store 10. Particularly, the signal strength of the signal 14 is such that it preferably defines a perimeter of about 100 yards or less from the store or the store premises 10. The broadcasting system 12 is thus a short-range radio (wireless) broadcasting system. As such, the broadcasting system 12 is operative to transmit signals to the inside of the store 10, the outside of the store 10, and/or both the inside and outside of the store 10.

The signal 14 carries information or data to a personal device 26 that is operative, adapted, and/or configured to receive the signal 14. The personal device 26 in FIG. 1 is representative of any and all types of electronic personal devices that are typically carried by potential customers and that are operative, adapted, and/or configured to receive and utilize a short-range wireless signal as described herein. To that end, a first potential customer 18 is shown having a cell phone 20, the cell phone 20 being a type of personal device. The first potential customer 18 is external to the store 10 (i.e. outside of the physical premises of the store 10) and is within the signal perimeter (range) 16 such that the cell phone 20 can receive the signal 14. A second potential customer 22 is shown having a personal digital assistant (PDA) 24, the PDA 24 being one type of personal device. The second potential customer 22 is internal to the store 10 (i.e. inside of the physical premises of the store 10) and is within the signal perimeter (range) 16 such that the PDA 24 can receive the signal 14.

The signal 14 carries information or data regarding or relating to the store 10 such as with respect to the products and/or services offered by the store in addition to store information such as hours of operation and the like. The information or data, in one form, may constitute an advertisement, commercial, offer, or product and/or services descriptions, choices, prices, and the like. Particularly, the information or data preferably constitutes an advertisement, commercial, or the like, without being exhaustive, for the products and/or services offered by the store 10. Hereinafter, the term advertisement will be used to denote the various information and data referenced in this paragraph unless specifically indicated to the contrary.

The advertisement may consist of audio information, video information, and/or a combination of audio/video information. The video information may be still data (static pictures or the like), moving data (movies or the like), or a combination of still and moving data. Of course, the advertisement may constitute other types of data that can be presented on a personal device.

In addition to the signal 14 being a short or limited range wireless signal, the signal 14 utilizes a preferably known protocol that can be currently utilized by existing personal devices. According to an aspect of the subject invention, the transmitter 30 generates the signal 14 utilizing a protocol or format that is already receivable and utilizable by the personal device. The ability to receive and utilize the signal is embedded in the personal device as part of its functionality or may be easily added to the personal device as via a plug-in card or module. The signal 14 is also preferably within an unlicensed radio frequency band of the radio frequency spectrum.

One such wireless protocol/format that meets the present criteria for the subject invention and which is preferably utilized, is Bluetooth™. Bluetooth™ is a short-range, low-power, wireless (radio) data protocol/format that operates in an unlicensed radio frequency band. Particularly, Bluetooth™ operates at 2.4 GHz at a range of around 30 feet in the ISM band. Details regarding Bluetooth™ can be obtained from Bluetooth SIG, Inc. of Overland Park, Kans., U.S.A. Particularly, reference and specific incorporation herein is made to the Bluetooth™ Specification, version 1.1, and the Bluetooth™ Profiles, both of which can be obtained from Bluetooth SIG, Inc.

Figure 2:
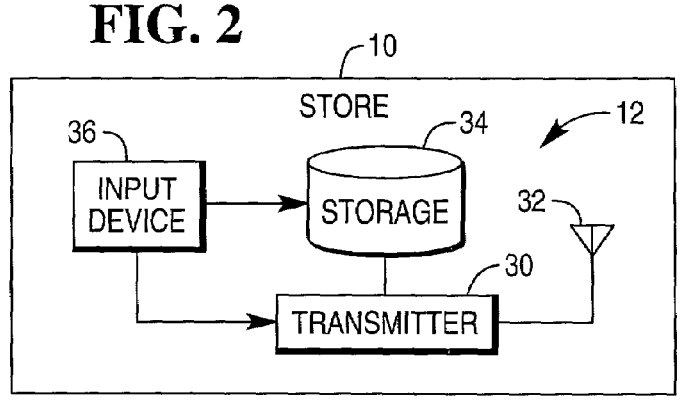
FIG. 2 is a block diagram of the broadcasting system of FIG. 1.

Referring to FIG. 2, there is depicted a block diagram of the broadcasting or transmitting system 12 within the store 10. The broadcasting system 12 includes a transmitter 30 that is in communication with an antenna 32. The transmitter is operative to generate the signal 14 and provide the signal 14 to the antenna 32. The antenna 32 is configured, adapted, and/or operative to radiate, broadcast, or transmit the signal 14 received from the transmitter 30. The antenna 32 is located such that the signal 14 is provided only exterior of the store 10, only interior to the store 10, or both interior and exterior to the store 10, depending on the application and/or the intended recipients.

The transmitter 30 is further operative to provide a short-range signal utilizing the signal protocol. The broadcasting system 10 further includes a storage device 34 that is in communication with the transmitter 30. The storage device 34 is configured, adapted, and/or operative to store an advertisement or multiple advertisements. An input device 36 is in communication with the storage device 34 and/or the transmitter 30 directly, and is configured, adapted, and/or operative to allow the input of an advertisement into the storage device 34. It should be appreciated that the transmitter 30 as depicted in FIG. 2 includes the necessary processor, processing unit, processing circuitry/logic, and/or the like to coordinate the inclusion or formatting of an advertisement from the storage device 34 or directly from the input device 36 as the signal or part of the signal 14.

The broadcasting system 12 is thus configured, adapted, and/or operative to receive an advertisement from the storage device 34 as received from the input device 36 (or directly from the input device 36) and wirelessly transmit the advertisement to a personal device that is within the signal perimeter 16. In this manner, any personal device that includes the necessary protocol/format receiver and utilization circuitry/logic may receive and utilize the advertisement. Utilization of the advertisement typically entails playing and/or showing the advertisement.

The signal 14 preferably includes coding that allows the personal device 26 to automatically receive and/or play the advertisement when the personal device 26 is on, or is in a standby mode. Thus, when the personal device 26 is within the perimeter 16 (range of the signal 14), the personal device 26 automatically receives and/or plays the advertisement.

Figure 3:
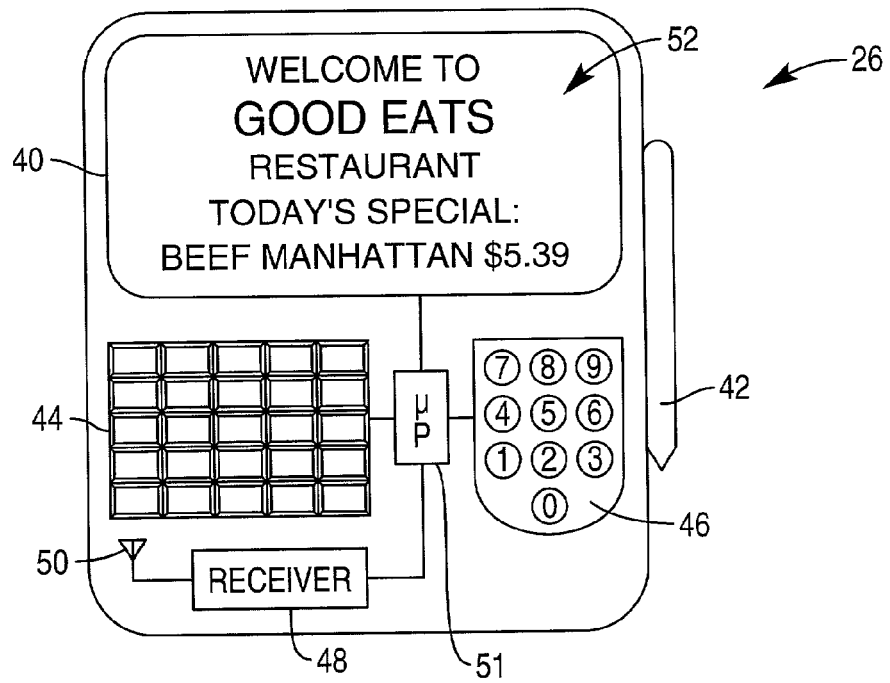
FIG. 3 is a representation of an exemplary personal device that is operative to receive the transmissions of the broadcasting system of FIGS. 1 and 2.

Referring to FIG. 3, there is depicted the generic personal device 26 that represents the myriad personal devices that can be used in conjunction with the broadcasting system 12. The personal device 26 includes a screen, display, or the like 40 that is preferably a touch-screen or that incorporates touch-screen capabilities. A stylus 42 may be used in conjunction with the screen 40 to enter information into the personal device, make selections of choices if applicable, and perform other tasks as is usual and/or customary for personal devices. The personal device 26 also includes a keypad 44 for alphabetic data entry and a keypad 46 for numeric data entry. A microprocessor or the like 51 is in communication with the screen 40, the alphabetic keyboard 44, and the numeric keypad 46. The personal device 26 operates in a normal manner to typical personal devices.

The personal device 26 also includes a receiver 48 that is in communication with the microprocessor 51 and an antenna 50. The antenna 50 is configured, adapted, and/or operative to receive the signal 14 and provide the signal to the receiver 48. The receiver 48 is configured, adapted, and/or operative to receive, process, and/or utilize the signal 14 in the particular protocol/format broadcast by the broadcast system 12 from the store 10. Preferably, the receiver 48 is a Bluetooth™ enabled or compatible device, in which case the antenna 50 is also Bluetooth™ compatible. In this manner, the personal device 26 is operative to receive and utilize the Bluetooth™ protocol or formatted information.

The personal device 26 is operative to display the signal 14 (advertisement) from the store 10 on the screen 40. The personal device 26 is within the perimeter 16 of the signal 14 and thus is proximate or in the store 10. As an example, an advertisement 52 is shown on the screen 40. The advertisement 52 is for a restaurant. The restaurant is advertising a "today's special" for the potential customer. Thus, when the personal device 26 is within range of the signal 14, the personal device 26, through its antenna 50 and receiver 48, receive the signal 14. The store 10 (restaurant) is thus able to provide information to the potential customer via the personal device of the customer.

It should be appreciated that the features and/or components of the personal device 26 as depicted in FIG. 3 are only exemplary of various features and/or components that may be part of a personal device such as a cell phone, a personal digital assistant (PDA), a portable computer, a special-purpose personal device, or the like. Thus, each type of personal device may or may not have the particular features and/or components shown and/or described in conjunction with FIG. 3 with the exception of the ability to receive and utilize the signal 14 transmitted by the broadcasting system 12. Further, any such personal device may have features and/or components not shown and/or described herein.

Figure 4:
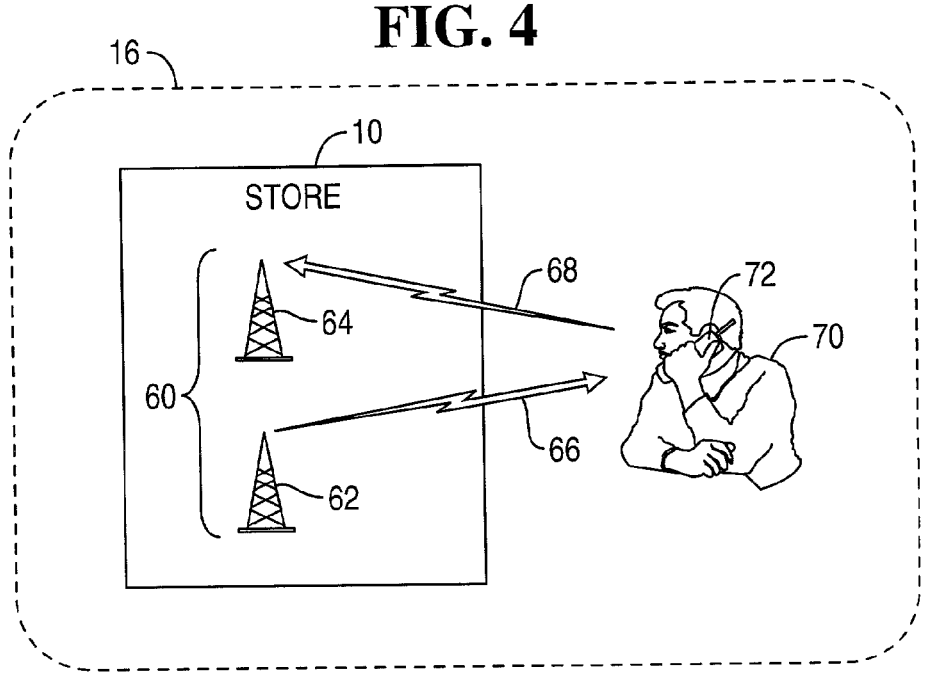
FIG. 4 is a representative diagram of the store having an exemplary wireless broadcasting and receiving system in accordance with the principles of the subject invention.

In the embodiment of FIGS. 2–4, the signal 14 is a one-way signal. Particularly, the signal 14 transmitted by the broadcasting system 12 is operative to only send a signal (advertisement) to personal devices. The personal devices are thus operative to receive, play, and/or show the advertisement. The signal 14 may thus include coding that allows the personal device 26 to receive, utilize, and/or play the advertisement.

Referring now to FIG. 4, there is depicted the store 10 having another embodiment of the subject invention. Particularly, the store 10 has a transmitting and receiving system, generally designated 60. The transmitting and receiving system 60 includes a transmitting or transmission system 62 and a receiving system 64. The transmitting system 62 is operative to generate and transmit a signal, represented by the bolt 66. As with the broadcasting system 12 of FIGS. 1 and 2, the signal 66 is an advertisement from the store 10 and is directed to a potential customer 70. Particularly, the signal 66 is directed to the personal device 72 (here depicted as a cell phone) of the potential customer 70. The potential customer 70 is shown exterior to the store 10 but within the perimeter 16 of the signal 66. Of course, the potential customer may be interior to the store 10. The composition, features, and/or characteristics of the signal 66 are the same as the signal 14, which is described above in connection with FIGS. 1–3.

The receiving system 64 of the transmitting and receiving system 60 is operative to receive a signal, represented by the bolt 68 from the personal device 72. The personal device 72 is thus operative, configured, and/or adapted to generate and transmit the signal 68. The signal 68 is of the same protocol/format as well as within the same frequency band as the signal 66. The personal device 72 is preferably already equipped, configured and/or adapted to receive and transmit the particular protocol/format of the signals 66 and 68. The personal device 72 preferably utilizes the Bluetooth™ protocol/format. The substance of the signal 68 is a reply, selection, or the like with respect to the signal 66.

Figure 5:
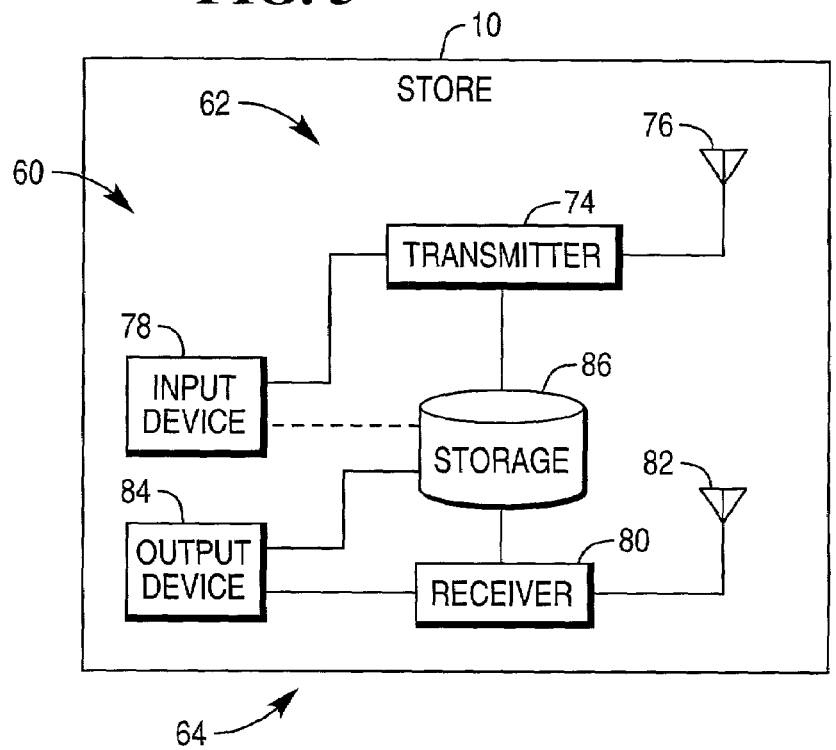
FIG. 5 is a block diagram of the broadcasting and receiving system of FIG. 4.

Referring to FIG. 5, there is depicted a block diagram of the transmitting and receiving system 60 within the store 10. The transmitting and receiving system 60 includes the transmission or transmitting system 62 and the receiving system 64. The transmitting system 62 includes a transmitter 74 that is in communication with an antenna 76. The transmitter 74 is operative to generate the signal 66 and provide the signal 66 to the antenna 76 in at least the same manner as the transmitter 30. The antenna 76 is configured, adapted, and/or operative to radiate, broadcast, or transmit the signal 66 received from the transmitter 74 in at least the same manner as the antenna 32. The transmitter 74 is further operative to provide a short-range signal utilizing the known protocol as described above in connection with FIGS. 1–3. Again, depending on the placement and/or type of antenna, the signal 66 may be provided interior to the store 10, exterior to the store 10, or both.

The transmitting system 62 further includes a storage device 86 that is in communication with the transmitter 74. The storage device 86 is configured, adapted, and/or operative to store an advertisement or multiple advertisements. An input device 78 is in communication with the transmitter 74 and may be in communication with the storage device 86 as represented by the dashed line. The input device 78 is configured, adapted, and/or operative to allow the input of an advertisement into the storage device 86. The input device 78 may be or include a number of different devices such as tape machines (e.g. VCR, cassette, or the like), digital input devices (e.g. DVD, CD, or the like), manual input devices (e.g. keyboard, microphone, or the like), or any other device that is capable of accepting input (either or both analog and digital input) by whatever means (i.e. mechanical or manual). It should be appreciated that the transmitter 74 as depicted in FIG. 5 includes the necessary processor, processing unit, processing circuitry/logic, and/or the like to coordinate the inclusion or formatting of an advertisement from the storage device 86 as the signal 66 or part of the signal 66.

The transmitting system 62 is thus configured, adapted, and/or operative to receive an advertisement from the input device 78 and/or the storage device 86 as received from the input device 78 and wirelessly transmit the advertisement to a personal device that is within the signal perimeter 16. In this manner, any personal device that includes the necessary protocol/format receiver and utilization circuitry/logic may receive and utilize the advertisement. Utilization of the advertisement typically entails playing and/or showing the advertisement.

The receiving system 64 includes an antenna 82 and a receiver 80 that is in communication with the antenna 82. The antenna 82 is configured, adapted, and/or operative to receive the signal 68 and provide the signal 68 to the receiver 80. The receiver 80 is configured, adapted, and/or operative to receive and process the signal 68 accordingly. As such, the receiver 80 includes the necessary and/or appropriate processor, processing unit, and/or processing circuitry/logic to perform the processing of the signal 68. It should be appreciated that while the transmitter 74 and the receiver 80 are shown as being separate, the transmitter 74 and the receiver 80 may share circuitry/logic as appropriate and/or necessary, especially the processor, processing unit, and/or processing circuitry/logic.

The receiving system 64 may also include (share) the storage device 86 which would be in communication with the receiver 80. Thus, the storage device 86 is operative to receive and store information or data of the signal 68. As an example, the information/data of the signal 68 may include a request for reservations, further inquiry of menu items and/or prices, a selection of further information as transmitted in the signal 66 from the store 10 and chosen by the potential customer, and/or the like. The receiving system 64 thus includes an output device 84 that is in communication with the receiver 80 and the storage device 86. The output device 84 may be an audio and/or video device. Particularly, the output device 84 may be a display, speaker, printer, recording device or the like, either alone or in combination with any other such device. The output device 84 is configured, adapted, and/or operative to provide in the manner of the device, the information/data of the signal 68. The receiver 80 may provide the information/data from the received signal 68 directly to the output device 84 as well as simultaneously to the storage device 86. The output device 84 may retrieve information from the storage device 86 in conjunction with the input device 78.

Figure 6:
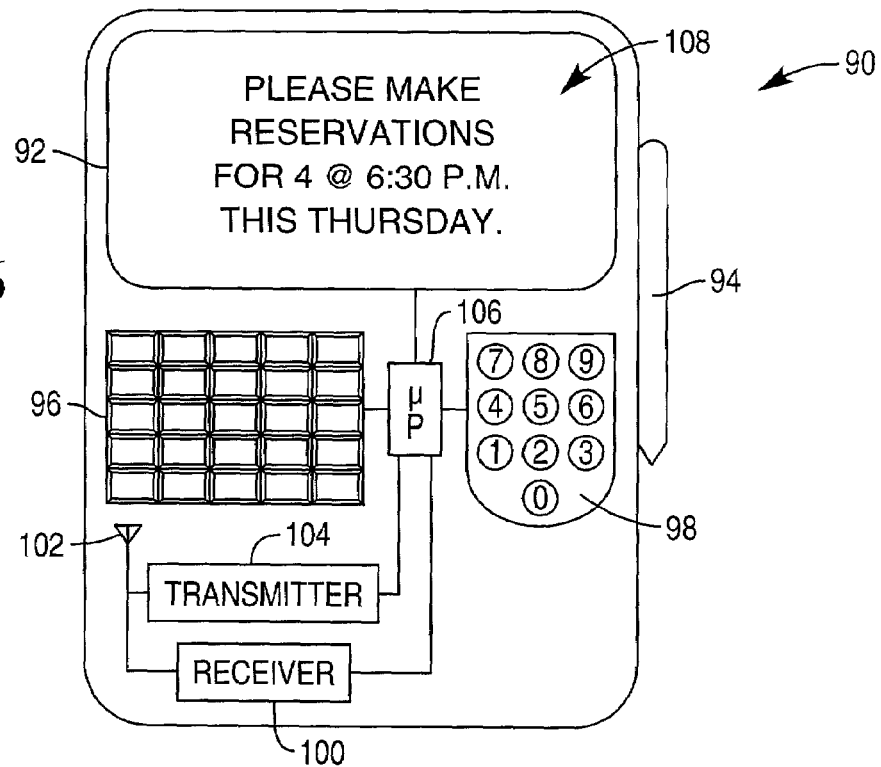
FIG. 6 is a representation of an exemplary personal device that is operative to receive the transmissions of the broadcasting system of FIGS. 4 and 5 and transmit signals to the receiving system of FIGS. 4 and 5.

In FIG. 6, an embodiment of a personal device, generally designated 90, configured, adapted, and/or operative to operate in connection with the embodiment of the subject invention as depicted in FIGS. 4 and 5. In particular, the personal device 90 includes a screen, display, or the like 92 that is preferably a touch-screen or that incorporates touch-screen capabilities. A stylus 94 may be used in conjunction with the screen 92 to enter information into the personal device, make selections of choices if applicable, and perform other tasks as is usual and/or customary for personal devices. The personal device 90 also includes a keypad 96 for alphabetic data entry and a keypad 98 for numeric data entry. A microprocessor or the like 106 is in communication with the screen 92, the alphabetic keyboard 96, and the numeric keypad 98. The personal device 90 operates in a normal manner to typical personal devices.

The personal device 90 also includes a receiver 100 that is in communication with the microprocessor 106 and an antenna 102. The antenna 102 is configured, adapted, and/or operative to receive the signal 66 and provide the signal to the receiver 100. The receiver 100 is configured, adapted, and/or operative to receive, process, and/or utilize the signal 66 in the particular protocol/format transmitted by the transmitting system 62 from the store 10. Preferably, the receiver 100 is a Bluetooth™ enabled or compatible device, in which case the antenna 102 is also Bluetooth™ compatible. In this manner, the personal device 90 is operative to receive and utilize Bluetooth™ formatted information.

The personal device 90 also includes a transmitter 104 that is in communication with the microprocessor 106 and the antenna 102. It should be appreciated that while the receiver 100 and the transmitter 104 share the antenna 102, and thus the antenna 102 as shown is adapted, configured, and/or operative to allow/permit both receiving and transmitting of signals, there may be a separate antenna for the receiver 100 and the transmitter 104. The transmitter 104 is operative to generate the signal 68 according to input from the personal device 90 and provide the signal 68 to the antenna 102.

Preferably, the transmitter 104 is a Bluetooth™ enabled or compatible device, in which case the antenna 102 is also Bluetooth™ compatible. In this manner, the personal device 90 is operative to transmit Bluetooth™ formatted information.

As shown on the screen 92, the personal device 90 is operative to display the information/data 108 of the signal 68 that has been input by the potential customer in response to an advertisement of the signal 66 (see the advertisement on the personal device of FIG. 3). Further to that example, the potential customer has requested that reservations for four people at 6:30 p.m. on Thursday. This information 108 is included in the signal 68 transmitted by the personal device 90 and received by the receiving system 62 of the store 10. The store 10 will receive and process the request.

In the embodiment of the subject invention shown and described in connection with FIGS. 4–6, the advertisement provided as or in the signal 66 may be interactive. Particularly, the signal 66 may have or provide coding that allows the personal device to display (or play if audible) choices or items that are selectable by the potential customer (e.g. a menu). The selected item or choice is then transmitted back to the receiver 80 for processing by the store 10. In another form, the coding may provide for layers of selectable items that may or may not be transmitted back to the receiver 80 for processing by the store 10. The store 10 may then respond to the response.

In the absence of coding in the signal 66 that allows the personal device to display or play choices, potential customer may utilize the personal device 90 to communicate with the store 10. This is accomplished by the personal device 90 generating a signal and transmitting the signal (via the transmitter 104 and the antenna 102) to the receiver 80 of the store 10.

In another form, the store 10 may provide an interrogation signal via the transmitter 74 and the antenna 76 that will be returned automatically by any personal device that is within the perimeter 16. The return signal may be coded for differentiation of personal devices by the store 10. In this manner, the store 10 may determine if any personal devices 90 are within the perimeter 16 and/or how many personal devices 90.

Operation

Referring to FIG. 7, there is depicted an exemplary manner of operation of the subject invention. In particular, there is depicted a flow chart, generally designated 110, of an exemplary manner of operation of the subject invention. In step 112, an advertisement is assembled by the store 10. In step 114, the advertisement is then input into the transmitting system. In step 116, the advertisement is formatted into the appropriate protocol. Preferably, the advertisement is formatted into the Bluetooth™ protocol. In this preferred embodiment, such Bluetooth™ "formatting" necessarily dictates the constraints and/or parameters of transmission by the transmitting system of the Bluetooth™ specifications. Once the advertisement has been appropriately formatted then, in step 118, the formatted advertisement is transmitted. In accordance with the principles of the subject invention, the transmission is aimed at Bluetooth™ enabled devices. Thereafter, in step 120, the receiving system of the store awaits for a Bluetooth™ formatted response from a Bluetooth™ enabled device.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

What is claimed is:

1. A method of providing an advertisement for a store to prospective customer comprising the steps of:
   compiling an advertisement;
   formatting the advertisement into a radio signal having a radio transmission protocol that is receivable by a personal device of a prospective customer, the personal device having a radio receiver enabled to receive the transmission protocol signal;
   transmitting the radio signal from the store to a perimeter of a source of the radio signal with a signal strength sufficient to be received by a personal device that is removed from the source of the radio signal; and
   in response to an offer contained in the advertisement, receiving a request from the personal device.

2. The method of claim 1, wherein the perimeter is inside the store.

3. The method of claim 1, wherein the perimeter is outside the store.

4. The method of claim 1, wherein the step of formatting utilizes Bluetooth™ radio transmission protocol, and the radio receiver of the personal device is Bluetooth™ enabled.

5. The method of claim 4, wherein the step of formatting includes the step of providing an interactive component to the radio signal.

6. An apparatus for providing an advertisement to a prospective customer comprising:
   a storage device operative to store an advertisement;
   a transmitter in communication with the storage device and operative to receive the advertisement from the storage device, the transmitter further operative to format the advertisement into a radio signal having a radio transmission protocol that is receivable by a personal device of a prospective customer having a radio receiver enabled to receive the transmission protocol signal;
   an antenna in communication with the transmitter and operative to transmit the radio signal with sufficient strength from the store to within a perimeter of the transmitter; and
   in response to an offer contained in the advertisement, receiving a request from the personal device.

7. The method of claim 6, wherein the perimeter is inside the store.

8. The method of claim 6, wherein the perimeter is outside the store.

9. The apparatus of claim 6, wherein the transmitter is operative to format the advertisement into a radio signal having Bluetooth™ radio transmission protocol.

10. The apparatus of claim 9, wherein the transmitter is operative to provide an interactive component to the radio signal.

11. A system for store advertising comprising:
    a storage device operative to store a store advertisement;
    a transmitter located at the store and in communication with the storage device and operative to receive the advertisement from the storage device, the transmitter further operative to format the advertisement into a radio signal having a radio transmission protocol that is receivable by a personal device of a prospective customer having a radio receiver enabled to receive the transmission protocol signal;
    a receiver located at the store and operative to receive an incoming radio signal of the radio transmission protocol from the personal device of the prospective customer;
    an antenna located at the store and in communication with the transmitter and the receiver, the antenna operative to transmit the radio signal with sufficient strength from the store to within a perimeter of the transmitter and receive the incoming radio signal from the personal device; and
    in response to an offer contained in the advertisement, receiving a request from the personal device.

12. The system of claim 11, wherein the perimeter is a limited distance outside of the store.

13. The system of claim 11, wherein the perimeter is inside of the store.

14. The system of claim 11, wherein the transmitter is operative to format the advertisement into a radio signal having Bluetooth™ radio transmission protocol.

15. The system of claim 11, wherein the transmitter is operative to provide an interactive component to the radio signal.

16. A system for store advertising comprising:
    a storage device operative to store a store advertisement;
    a transmitter in communication with the storage device and operative to receive the advertisement from the storage device, the transmitter further operative to format the advertisement into a radio signal having a radio transmission protocol that is receivable by a personal device of a prospective customer having a radio receiver enabled to receive the transmission protocol signal;

an antenna located at or about a position proximate to the store and in communication with the transmitter and the receiver, the antenna operative to transmit the radio signal with a signal strength sufficient to be received by a personal device that is greater than 50 meters removed from the antenna; and in response to an offer contained in the advertisement, receiving a request from the personal device.

17. The system of claim 16, wherein the transmitter and antenna are further operative to transmit the radio signal to a perimeter that is about 100 meters from the antenna.

18. The system of claim 17, wherein the perimeter comprises an area within the store and an area outside of the store.

* * * * *